United States Patent                                         [15]  3,691,124
Barron                                                        [45]  Sept. 12, 1972

[54] STABILIZED POLYMER IN OIL LATEXES AND SUSPENSIONS

[72] Inventor: Benny G. Barron, Lake Jackson, Tex. 77566
[73] Assignee: The Dow Chemical Company, Midland, Mich.
[22] Filed: Sept. 10, 1970
[21] Appl. No.: 71,198

[52] U.S. Cl. .................260/29.6 WB, 260/29.6 WQ
[51] Int. Cl. .................................................C08f 1/13
[58] Field of Search .............260/29.6 WB, 29.6 WQ

[56]  References Cited

UNITED STATES PATENTS 3,284,393  11/1966  Vanderhoff et al.......269/29.6
3,329,638   7/1967  Blyth.........................260/29.6

OTHER PUBLICATIONS

Chemical Abstracts 56, 4967d (1962)

Primary Examiner—William H. Short
Assistant Examiner—E. A. Nielsen
Attorney—Griswold & Burdick, Albin R. Lindstrom and Richard G. Waterman

[57]  ABSTRACT

Polymer in oil emulsions resulting from the water-in-oil emulsion polymerization of water soluble monomers have improved stability when the copolymers of a dialkylaminoalkyl methacrylate or methacrylamide with an alkylacrylate or methacrylate is used as the emulsions stabilizer.

5 Claims, No Drawings

STABILIZED POLYMER IN OIL LATEXES AND SUSPENSIONS

BACKGROUND OF THE INVENTION

The manufacture of latexes of polymers of water soluble monomers in inert hydrophobic liquids was known. However, as is true for the aqueous latex counterparts of polymers from water insoluble monomers, the resulting colloidal stability of the system is not sufficient to withstand all of the environmental or applied stresses to which it would be exposed. Typical of these stresses are prolonged storage, extremes of heat and cold, mechanical shear and others. In aqueous latex systems it is known to add wetting agents to impart stability. The unpredicability of operable agents is notorious. To provide stabilizing agents for the water-in-oil latexes is the principal object of this invention.

DISCUSSION OF PRIOR ART

The water-in-oil emulsion polymerization of water soluble monomers is disclosed and claimed in U.S. Pat. No. 3,284,393 issued Nov. 8, 1966. Therein it is taught that ethylenically unsaturated monomers having a water solubility of at least 5 percent can be emulsified in an inert hydrophobic liquid using a water-in-oil emulsifying agent in an amount ranging between 0.1 and 10 weight percent of the oil phase. The agents described as useful in that patent are water-in-oil emulsifying agents having a low hydrophile/lyophile balance. Similar compounds are used in an analogous function in U.S. Pat. No. 3,278,506 issued Oct. 11, 1966.

Numerous patents mention dialkyl aminoalkyl methacrylate and methacrylamide. For example, U.S. Pat. No. 2,649,438 teaches the diethyl aminoethyl derivative as a copolymerizable monomer with acrylonitrile. The same monomeric entity is indicated as useful in making a polymeric flocculating agent in U.S. Pat. Nos. 3,014,896; 3,157,595 and 3,171,805. Other derivatives useful as dye assistants are taught in U.S. Pat. No. 2,595,907. Their use in ion exchange resins is suggested in U.S. Pat. No. 2,567,836.

TECHNICAL DISCLOSURE OF THE INVENTION

By this invention stability is imparted to latexes of polymers of water soluble monomers in inert hydrophobic liquids by incorporation into the emulsions of stabilizing amounts of a copolymer of (1) at least 5 mole percent of a monomer of the structure:

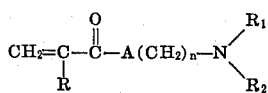   I wherein R is hydrogen or methyl; $R_1$ and $R_2$ are independently selected from alkyl groups having from one to three carbon atoms; A is $-O-$ or $-NH-$ and n is a whole number of from 2 to 6 and (2) not more than 95 mole percent of at least one monomer having the structure:

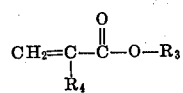   II wherein $R_3$ is an alkyl group having from six to 22 carbon atoms and $R_4$ is hydrogen or methyl.

Representative compounds of Formula I are dimethyl aminoethyl methacrylamide; diethylaminoethyl methacrylate; dimethylaminopropyl methacrylamide; methyl propyl aminopropyl methacrylate; dimethyl amino butyl acrylate; dimethyl aminohexyl methacrylamide; dipropylaminoamylacrylamide and others falling within the scope of the expressed structure.

Typical species of Formula II are hexyl acrylate; 2-ethylhexyl acrylate; lauryl methacrylate; myristyl acrylate cetyl methacrylate; stearyl methacrylate and other compounds falling within the defined scope.

The stabilizing agents are prepared by conventional free radical catalyzed polymerization of the indicated monomers. To achieve the desired stabilization properties the copolymer must contain at least 5 mole percent of the dialkylamino alkyl acrylate, methacrylate or amido isomers. The ratio of the monomers as well as the chain length of the nonionic monomer should be adjusted to provide complete solubility in the oil phase polymerization medium. The preparation is exemplified in the following example.

EXAMPLE 1

The following monomer mixture was charged into a 500 milliliter flask equipped with a reflux condensor and thermometer; 42.85 grams of dimethylaminoethyl methacrylamide; 57.1 grams of lauryl methacrylate and 55 milliliters of p-dioxane. This was brought to reflux temperature and the following initiator solution added: 0.2 gram of azo-bis-isobutyronitrile in 15 milliliters of p-dioxane. Two additional increments of the azo-initiator in dioxane were added at one hour intervals for a total initiator level of 0.6 gram. After 6 hours at reflux temperature, excess dioxane was removed under vacuum and 73 grams of deodorized kerosene was added to give a 50 percent copolymer solution.

In a similar manner a stabilizer was prepared by substituting 23.6 grams of methacrylic acid for the dimethyl aminoethyl methacrylamide.

Other stabilizing agents containing the required minimum 5 mole percent of the monomer of Formula I can be prepared by the exemplified procedure or by other known polymerization procedures using peroxy compounds or other known free radical catalysts in mass, solution, suspension or emulsion techniques.

The stabilizing agents provide unusual stabilizing effectiveness to water-in-oil emulsion systems. Amounts of at least about 0.5 weight percent of the agent based on the polymer in the emulsions. The amount may be as great at 5 or more percent. The minimum concentration to obtain the desired stability will be readily determined by simple preliminary experiment.

The agent is most conveniently added to the latex from an organic solution, deodorized kerosene being a typical solvent. Other liquid hydrocarbons may also be employed. The choice of solvent is dictated by its miscibility with the continuous organic phase of the emulsions.

The agents of this invention may be employed in the water-in-oil emulsion polymerization of monomers having a solubility of at least 5 weight percent. REpresentative of such monomers are acrylamide, methacrylamide, acrylic acid, methacrylic acid, vinyl trimethylammonium chloride, alkali metal and ammonium salts of 2-sulfoethylacrylate, ar-sodium styrene sulfonate, 2-aminoethylmethacrylate hydrochloride, alkali metal and ammonium salts of vinyl benzyl sulfonates and the like. When aqueous solutions of the monomers are used, they can be varied widely in monomer content. Proportions between 100 and 5 weight percent monomer corresponding to 0 to 95 weight percent water are used depending upon the monomer and the temperature of polymerization. The ratio of monomer phase (monomer or aqueous solution of monomer) to oil phase is also widely variable, advantageously between 30 to 70 parts of the monomer phase to between 70 to 30 parts of the oil phase. A monomer phase to oil phase ratio of about 30 to 70 is preferred.

In order to emulsify the monomer phase into the oil phase to give a water-in-oil emulsion, an emulsifying agent of the water-in-oil type is used in amount ranging between 0.1 to 10 weight percent of the oil phase. Any conventional water-in-oil emulsifying agent can be used, such as hexadecyl sodium phthalate, sorbitan mono-oleate, sorbitan monostearate, cetyl or stearyl sodium phthalate, metal soaps and the like. Emulsifying agent having a low hydrophile/lyophile balance are preferred. A simple test will suffice to determine whether a given emulsifying agent is adequate for a given water-in-oil system, and whether one water-in-oil emulsifying agent is preferable to another. Obviously, a free radical chain stopping emulsifying agent would not be used.

The oil phase can be any inert hydropholic liquid which can readily be separated from the disperse phase polymeric product. Of such liquids the hydrocarbons and perchloroethylene are advantageous. Aryl hydrocarbons such as toluene and xylene are preferred.

Free radical yielding initiators useful in polymerizing ethylenic unsaturated monomers, such as benzoyl peroxide, lauroyl peroxide, potassium persulfate and the like are used in the polymerization, advantageously in amounts ranging between 0.002 and 0.2 percent by weight of the monomers. Other initiation sources such as high energy irradiation may also be used.

Elevated polymerization temperatures, advantageously between 55° to 80° C. are used with free radical yielding initiators. Within such a temperature range, conversion of monomer to polymer is substantially complete in from one-half hour to several days depending upon monomer and reaction variables.

The emulsion polymerization is generally carried out at atmospheric pressure. However, superatmospheric pressure is advantageously used when volatile ingredients are involved.

To prepare the emulsions the water-in-oil emulsifying agent is dissolved in the oil phase, while the free radical initiator, when one is used, is dissolved in the oil or monomer phase depending upon whether an oil or water-soluble initiator is used. An aqueous solution of monomer or mixed monomers or monomer per se is then added to the oil phase with agitation until the monomer phase is emulsified in the oil phase, and the reaction is carried out as indicated above. The order of addition of reaction media ingredients is not critical. The polymerization is initiated and continued with agitation until conversion of monomer to polymer is substantially complete. A polymeric emulsions is thereby obtained. The polymer may be separated from the polymerization medium, advantageously by adding a flocculating agent and filtering followed by washing and drying. Alternatively the emulsions reaction product can be used as such.

By this means water soluble monomers can be polymerized into high molecular weight polymers at rapid rates of polymerization.

The advantages of the stabilizers of this invention is illustrated in the following example wherein all parts and percentages are by weight.

EXAMPLE 2

A continuous oil phase was prepared by mixing 210 milliliters of deodorized kerosene and 9.75 grams of dimethyl dihydrogenated tallow ammonium chloride (Arquad 2HT-100). A separate aqueous monomer phase was made by mixing 57.8 grams dimethylaminoethyl methacrylamide hydrochloride; 85.2 grams acrylamide; 61.5 grams water; 0.024 gram tertiary butyl hydroperoxide. Each phase was sparged 5 minutes with nitrogen.

An inverse cationic emulsions was prepared by mixing the two phases together and emulsifying with a high speed mixer. The temperature was raised to 48° C. while sparging with nitrogen and agitating at slow speed using a paddle type stirrer. Temperature was controlled by a water bath held at 48° to 50° C. The exothermic polymerization caused an increase in reaction temperature to 110° C. after which the bath temperature was increased to 75° C. The charge was held at 70° to 75° for 30 minutes to complete the polymerization.

The cationic emulsions was treated with 1.5 milliliters of the cationic stabilizer solution prepared in Example I and stirred 5 minutes. An azeotropic mixture of water and kerosene was removed under vacuum to give a emulsions consisting of 50 percent of an 80/20 mole percent copolymer of acrylamide and dimethylaminoethyl methacrylamide hydrochloride suspended in kerosene. An additional 0.5 milliliter of cationic stabilizer was then added and agitation continued for 5 minutes.

What is claimed is:

1. A WATER-in-oil polymer dispersion of (1) a polymer made by the emulsion polymerization of a vinyl monomer having a water solubility of at least 5 weight percent and (2) a liquid hydrocarbon as a continuous oil phase wherein said dispersion contains as a stabilizer therefor a copolymer of not more than 95 mole percent of a monomer of the formula

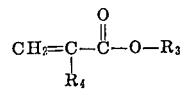

wherein $R_3$ is an alkyl group containing from six to 22 carbonators and $R_4$ is hydrogen or methyl, and at least 5 mole percent of a cationic monomer having the formula

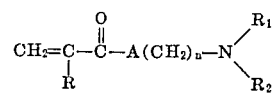

wherein R is hydrogen or methyl $R_1$ and $R_2$ are the same or different alkyl groups having from one to three carbons, A is oxygen or

and $n$ is a whole number from 2 to 6.

2. The polymer dispersion of claim 1 wherein said hydrocarbon is deodorized kerosene.

3. The polymer dispersion of claim 1 wherein said cationic monomer is dimethylaminoethyl methacrylamide.

4. The polymer dispersion of claim 3 wherein the other monomer is lauryl methacrylate.

5. In the process for making polymers and copolymers of water soluble ethylenically unsaturated monomers wherein there is formed a water-in-oil emulsion of the group consisting of a water soluble vinyl monomer having a water solubility of at least 5 weight percent and aqueous solutions thereof, in an inert hydrophobic liquid hydrocarbon dispersion medium containing between 0.1 and 10 weight percent of a water-in-oil emulsifying agent and wherein the proportion of monomer phase ranges between 30 and 70 percent of the emulsion, heating the emulsion under free radical forming conditions to polymerize monomer in the disperse phase in said dispersion medium and recovering the polymerized emulsion product, the improvement comprising the stabilization of the emulsion products with a copolymer of (1) at least 5 mole percent of a monomer of the structure

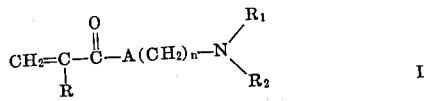

wherein R is hydrogen or methyl; $R_1$ and $R_2$ are independently selected from alkyl groups having from one to three carbon atoms; A is —O— or

and $n$ is a whole number of from 2 to 6 and (2) the remainder of at least one monomer having the structure

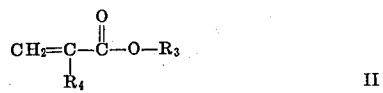

wherein $R_3$ is an alkyl group having from six to 22 carbon atoms and $R_4$ is hydrogen or methyl.

* * * * *